United States Patent [19]

Braden et al.

[11] Patent Number: 5,032,285
[45] Date of Patent: * Jul. 16, 1991

[54] REVERSE EMULSION BREAKING METHOD USING AMINE CONTAINING POLYMERS

[75] Inventors: Michael L. Braden; Stephan J. Allenson, both of Richmond, Tex.

[73] Assignee: Nalco Chemical Company, Naperville, Ill.

[*] Notice: The portion of the term of this patent subsequent to Jun. 5, 2007 has been disclaimed.

[21] Appl. No.: 464,090

[22] Filed: Jan. 12, 1990

[51] Int. Cl.$^5$ .............................................. B01D 17/04
[52] U.S. Cl. .................................... 210/708; 210/734; 210/735; 252/341; 252/344
[58] Field of Search ............... 210/708, 725, 727, 728, 210/732–735; 252/340, 341, 344, 358

[56] References Cited

U.S. PATENT DOCUMENTS

| 3,493,501 | 2/1970 | Eck | 210/735 |
|---|---|---|---|
| 4,154,698 | 5/1979 | Doft | 210/708 |
| 4,318,956 | 3/1982 | Stevens | 427/393.4 |
| 4,396,752 | 8/1983 | Cabestany et al. | 210/734 |
| 4,454,047 | 6/1984 | Becker et al. | 210/708 |
| 4,715,962 | 12/1987 | Bhattacharyya et al. | 210/708 |
| 4,734,274 | 3/1988 | Allenson | 423/265 |
| 4,741,835 | 5/1988 | Jacques et al. | 210/708 |

FOREIGN PATENT DOCUMENTS 69955 1/1983 European Pat. Off. ............. 210/734

Primary Examiner—Peter Hruskoci
Attorney, Agent, or Firm—Robert A. Miller; Donald G. Epple

[57] ABSTRACT

A method for resolving an oil-in-water emulsion by dosing the water to be resolved with a polymer produced by the emulsion polymerization of only hydrophobic monomers where at least one monomer is a neutral amine containing monomer which becomes hydrophilic when the amine is salified.

6 Claims, No Drawings

5,032,285

REVERSE EMULSION BREAKING METHOD USING AMINE CONTAINING POLYMERS

FIELD OF THE INVENTION

The invention is the field of reverse emulsion breaking. That is the field of separating oil from an oil-in-water emulsion.

BACKGROUND OF THE INVENTION

An emulsion is simply a stable mixture of two or more immiscible liquids maintained by emulsifiers. The emulsions are characterized as having a continuous phase and a dispersed phase. In oil field terminology, an emulsion is a water-in-oil emulsion. An oil-in-water emulsion is called a reverse emulsion.

Reverse emulsions most commonly occur in secondary and tertiary oil recovery. For, in those types of recoveries, water, steam, surfactant or polymer are traditionally forced downhole to push oil out of the formation. In the process, the water mixes with the oil and is produced at the well-head along with the oil. This produced water is intimately mixed with the oil in the formation under pressure. Because of the pressure and mixing in the presence of surfactants or polymers, typically produced water is an oil-in-water emulsion; that is a reverse emulsion.

This reverse emulsion must be broken for at least two reasons. Typically, the water must be clarified before it can be sent to waste treatment systems. The water must also be clarified if it is to be recycled downhole for forcing more oil from the formation. In either of those two cases, failure to clarify the water by removing oil can result in serious problems. Most waste treatment facilities are not equipped to handle oil-in-water emulsions on the scale produced by an oil producing well. Moreover, if unclarified produced water is sent downhole, contaminants in the water can plug the formation.

Another reason to clarify the water by breaking the reverse emulsion is to reclaim the oil. The purpose of an oil recovery program is to produce oil for sale.

SUMMARY OF THE INVENTION

The inventors have developed a polymer which can be used as reverse emulsion breaker. The polymer can either be a homopolymer or a polymer containing more than one monomer type. In either case, at least one of the monomers must be amine containing monomer. That amine containing monomer generally is hydrophobic when the amine is neutral and hydrophilic when the amine is salified. Preferably all of the monomers utilized will be hydrophobic. More preferably, the amine containing monomer will be hydrophobic when neutral. However, the amine must be hydrophilic when the amine is salified. A neutral amine is an amine that does not have a positive charge. A salified amine is a protonated amine that bears a positive, i.e. cationic charge.

In practice, the amine containing polymer is added to the oil-in-water emulsion being treated. The neutral amine becomes automatically salified by the available hydrogen ion from the water to be treated. The emulsion being treated is broken (i.e. resolved) in the process, and the polymer becomes solubilized. The water to be treated should be acidified when its effective pH is more than about 8 in order to lower its pH to 8 or below using acidifiers such as hydrochloric acid, sulfuric acid, or other acidifiers known in the art.

The polymer will remain in the emulsion form as long as the effective pH of the polymer in the oil phase of the emulsion, is greater than 8. It is understood, that the pH of an oil phase cannot be directly taken. However, if the system is inverted and the pH taken, the resultant pH will be approximately 8 or greater.

That is, if the polymer is to remain in emulsion form, it is important that the pH of the water phase remain at or above approximately pH 8. If the pH of the water phase falls below approximately pH 8, the polymer will become salified. Once salified, the polymer will commence dissolving in water, and the emulsion will break.

The emulsion will break when added to water to be treated because of dilution of the continuous phase or because of salified polymer if the pH of the treated water is less than about 8. The pkb for the salified amine is so low that salification will occur upon dilution with produced water, since water produced from an oil field will have a pH of less than about 8. As salification commences and continues, the polymer becomes less and less coiled. The salified polymer becomes more extended as it becomes increasingly more charged. The salified copolymer thus becomes available for disrupting the liquid/liquid interface to break the emulsion.

Preferably, the polymers of this invention contain at least 30 mole percent neutral amine containing monomer. More preferably, these polymers will contain at least 40 mole percent neutral amine containing monomer. Most preferably, these polymers will contain 40 to 50 mole percent neutral amine containing polymer. Polymers containing at least 40 mole percent neutral amine containing monomer tend to provide more consistent performance over polymers containing less amine. Homopolymers which can be prepared by oil-in-water emulsion polymerization are usable as long as the emulsion is stable, e.g. diethylaminoethylmethacrylate homopolymer.

Because of viscosity considerations, preferably, the polymer will be added to the system as an oil-in-water latex. However, it is possible to first dissolve the polymer in water and feed the polymer to the system as a solution polymer.

The emulsion to be treated is preferably treated, i.e. dosed, with at least 0.1 ppm active polymer, more preferably from 0.1 to 20 ppm active polymer, and most preferably from 0.1 to 5 ppm active polymer.

THE POLYMERS

The polymers are produced by the emulsion polymerization or neutral monomer in a water external latex. The polymer includes a neutral amine containing monomer which becomes hydrophilic when the amine reacts with acid to form an amine salt, (i.e. when the amine is salified). Such amine containing monomers can be ascertained by those skilled in the art. Included among the suitable monomers are dimethylaminoethyl methacrylate, dimethylaminopropylmethacrylamide, diallylamine, diethylaminoethyl methacrylate, dimethylaminoethyl acrylate, diethylaminoethyl acrylate and N,N-diallylcyclohexylamine.

The polymers can also include non-amine containing hydrophobic monomers. Such monomers can be ascertained by one skilled in the art without undue experimentation. Included among the suitable hydrophobic monomers are butyl acrylate, ethyl acrylate, methyl methacrylate, lauryl acrylate, stearic methacrylate and styrene.

THE EMULSIFIERS

Emulsifiers (including emulsifier mixtures) suitable for preparing oil-in-water emulsions can be used in preparing the polymers of this invention, or in preparing a latex containing those polymers. Such emulsifiers generally have an HLB greater than 8 and more preferably having an HLB within the range of 8 to 24. Suitable emulsifiers can readily be determined by those skilled in the art. The term HLB and the method of determining suitable emulsifiers are discussed in the March 1980 ICI Americas, Inc. publication entitled "The HLB System a Time Saving Guide to Emulsifier Selection."

THE INITIATORS

Initiators for emulsion polymerization are well known and suitable initiators for preparing the polymers of the invention can be readily ascertained by those skilled in the art. Thermal and/or redox initiators are most preferred. But other types of initiators can be used.

PREPARATION OF THE POLYMERS

Procedure A

Below is a typical emulsion polymerization procedure using ammonium persulfate as the catalyst.

| | Materials Needed | Percentage |
|---|---|---|
| A. | Water | 76.36 |
| | Triton X-405 | 1.71 |
| | Sodium Lauryl Sulfate | 0.93 |
| B. | DMAEM (45 mole percent) | 11.33 |
| | Ethylacrylate (27.5 mole percent) | 4.33 |
| | Methyl methacrylate (27.5 mole percent) | 4.34 |
| C. | Ammonium persulfate (10 percent in water) | 0.33 |
| D. | Sodium meta-bisulfite (5 percent in water) | 0.67 |

1. Charged items listed in (A) to a 500 ml round bottom flask equipped with an overhead stirrer, nitrogen purge, and thermometer.
2. Started stirring at moderate speed.
3. To a separate beaker, combined items listed in (B).
4. Added CONTENTS in beaker to flask. A milky white mixture resulted.
5. Started nitrogen purge. (Caution! Foaming will occur if the flow rate of the nitrogen gas is too high.)
6. Heated to 30° C.
7. Added (C). Stir for 15 seconds.
8. Added (D). Temperature began to rise five minutes after the addition of (D). Temperature reached a maximum of 50° C.
9. Stirred for 4 hours.
10. Transferred finished product to a storage container. The product was a milky white latex with a bluish cast and did not settle out. Tests for residual DMAEM and acrylate monomer were negative.

Procedure B

The following emulsion polymerization procedure was used when Vazo 67 catalyst was used to initiate the reaction.

| | Materials Needed | Percentage |
|---|---|---|
| A. | Water | 76.36 |
| | Triton X-405 | 1.71 |
| | Sodium Lauryl Sulfate | 0.93 |
| | Vazo 67 | 0.01 |
| B. | DMAEM (45 mole percent) | 11.33 |
| | Ethylacrylate (27.5 mole percent) | 4.33 |
| | Methyl methacrylate (27.5 mole percent) | 4.34 |

1. Charged items listed in (A) to a 500 ml round bottom flask equipped with an overhead stirrer, nitrogen purge, additional funnel, reflux condenser, and thermometer.
2. Started moderate stirring.
3. Started nitrogen purge. (Caution! Foaming will occur if the flow rate of the nitrogen gas is too high.)
4. Heated to 60° C.
5. Added to the additional funnel items listed in (B).
6. At 60° C., started addition of monomers. Added over a three hour period.
7. After addition, continued heating for one hour at 60° C.
8. Transferred finished product to a storage container.

Vazo 67 is a trademark of the Dow Chemical Company for a free radical initiator.

The product was a milky white latex with a bluish cast and did not settle out. Test for residual DMAEM, ethyl acrylate and methyl methacrylate proved negative.

The molecular weight of the cationic water external latex polymers made from ethylacrylate, methyl methacrylate and dimethylaminoethyl methacrylate was around 2.5 million. The average particle size was approximately 0.15 microns. The viscosity of the product was 5 cps measured on a Brookfield viscometer with a #1 spindle, at 30 rpm at 25° F. The product had a pH within the range of 8 to 9. Upon lowering the pH to 3 with ten percent hydrochloric acid, the product became clear and highly viscous.

U.S. Pat. No. 4,318,956, by Röhm and Haas Company, which teaches another procedure for making water external latex polymers and is hereby incorporated by reference.

List cf polymers Tested

The polymers tested show that hydrophobic polymer having from 30–100 mole percent amines work well. The following amines were prepared according to emulsion Procedures A or B described and were evaluated in the oil-in-water emulsion form, unless otherwise indicated:

| Number | Name | mole %/mole % |
|---|---|---|
| A 1 | EA/DMAEM | 55/45 |
| A 2 | MMA/DMAEM | 55/45 |
| A 3 | BA/DMAEM | 55/45 |
| A 4 | iBA/DMAEM | 55/45 |
| B 1 | DEAEM/DMAEM | 55/45 |
| C 1 | DEAEM | 100 |
| D 1 | EA/MMA/DMAEM | 27.5/27.5/45 |
| D 2 | EA/MMA/DMAEM | 27.5/27.5/45 |
| E 1 | EA/DMAEM | 65/35 |
| E 2 | EA/DMAEM | 60/40 |
| E 3 | MMA/DMAEM | 70/30 |
| E 4 | MMA/DMAEM | 65/35 |
| E 5 | MMA/DMAEM | 60/40 |
| E 6 | BA/DMAEM | 60/40 |
| E 7 | BA/DMAEM | 65/35 |
| E 8 | BA/DMAEM | 70/30 |
| E 9 | BA/DMAEM | 55/45 |
| E 10 | EA/DMAPMA | 55/45 |
| E 11 | EA/DMAPMA | 60/40 |
| E 12 | EA/DMAPMA | 65/35 |
| E 13 | EA/DMAEA | 55/45 |
| E 14 | EA/DMAEA | 60/40 |
| E 15 | EA/DMAEA | 65/35 |
| E 16 | EA/DMAEA | 70/30 |
| E 17 | MMA/DMAEM | 55/45 |

GLOSSARY OF ABBREVIATIONS

MAA = Methacrylic Acid
AcAm = Acrylamide
AA = Acrylic Acid
BA = Butyl acrylate
DMAEM = Dimethylaminoethyl methacrylate
EA = Ethyl acrylate
iBA = Isobutylacrylate
DMAPMA = Dimethylaminopropyl methacrylamide
MMA = Methyl methacrylate
DMAEA = Dimethylaminoethyl acrylate
DEAEM = Diethylaminoethyl methacrylate

BOTTLE TEST PROCEDURE

Several tests were used to evaluate the new cationic WELS, (i.e. water external latexes) these are described below:

A. Ratio Test

1. Collected a chemical-free sample of producing water containing the dispersed oil.
2. Filled six bottles to the 100 ml mark with freshly collected sample and inverted several times.
3. By means of an Eppendorf syringe, pipetted 0.05 (5 ppm), 0.10 (10 ppm), 0.15 (15 ppm), 0.20 (20 ppm), 0.50 (50 ppm) ml of the one percent (1%) test solution to the dispersion in the bottles (bottle 6 is a blank).
4. Capped the bottles and agitated 30–50 slow rolls. Set bottles on a flat surface and observed water clarity and separation. Recorded observations on bottle test sheet.
   a. A numerical system of 1–10 was used to rate the bottles. A (1) represents the best in water quality, speed and degree of separation, and a (10) the worst.
5. Agitated bottles again. This time gave the bottles 50–100 vigorous rolls or shakes. Set bottles on flat surface and again observed and recorded on the bottle test sheet the clarity of the water and the speed and degree of separation.

B. Elimination Test

1. From the Ratio Test Results selected a chemical ratio that showed the first signs of clarification but did not treat completely. (This ratio was used to evaluate chemicals included on the Elimination Test.)
2. Obtained fresh fluid sample from same point as sample for Ratio Test. Followed the same procedure as in the Ratio Test except that the various formulae were injected at the chemical ratio rather than one formula at several ratios.
3. Observed results and recorded on the bottle test sheet.
4. Selected the best three chemicals for further evaluation in the Confirmation Test.

C. Confirmation Test

The Confirmation Test was run similarly to the Ratio and the Elimination Tests except that only the three best formulae selected from the Elimination Test were used. The test was run on a fresh sample using two ratios below and one ratio above the level at which the Elimination Test was run. The reverse emulsion breaker giving the cleanest water, the tightest and fastest degree of separation, and widest treating range was selected.

TESTS

Reverse emulsion breaking testing procedures were conducted on a number of different types of water systems. The testing procedures described above were utilized. The tests are reported below.

In each set of tests, the first test reported is labelled Standard (STD). The Standard was the chemical being used to treat that water on a commercial basis. That chemical was chosen as a standard because it was assumed that the user selected it as the optimal chemical for treatment desired.

Description of the Tables

Section A products are standard commercial products which were subject to the Ratio Test to determine and describe dosage for the products of this invention.

Section B products are product tested against the standard which were subjected to the elimination test. Those products which passed this test were then subjected to the confirmation test. Those products (Section C) which passed the confirmation test would normally be considered good commercial candidates.

All chemicals listed as Standards (e.g. F-x, G-x, H-x, I-x, or J-x where x = an integer) are commercially available polyamines used for the application tested.

For all of the tables, triethanolamines, hexamethylene diamine, and bishexamethyl triamine (i.e. BHMT bottoms) as quat and non-quat condensates were tested but generally didn't work as well as the standard. Those that worked as well as the standard were reported in the appropriate table. Some of these formulations include metal salts such as zinc chloride, aluminum chloride or iron sulfates blended with the polyamine.

TABLE I

| Chemical Code | ppm Used | ppm Active | Water Clarity | Degree of Separation |
|---|---|---|---|---|
| Section A | | | | |
| Std J-1 | 1 | .55 | 4 | 2 |
| Std J-1 | 2 | 1.10 | 3 | 2 |
| Std J-1 | 4 | 2.2 | 3 | 2 |
| Std J-1 | 5 | 2.75 | 1− | 2 |
| Std J-1 | 6 | 3.3 | 1+ | 2 |
| Std J-1 | 8 | 4.4 | 2 | 2 |
| Std J-1 | 10 | 5.5 | 3 | 2 |
| Blank | — | — | 10 | 10 |
| Section B | | | | |
| I-6 | 5 | 2.50 | 2 | 2 |
| J-1 | 5 | 2.75 | 2 | 2 |
| E-2 | 5 | 1 | 5 | 4 |
| E-1 | 5 | 1 | 5 | 4 |
| B-1 | 5 | 1 | 5 | 4 |
| E-13 | 5 | 1 | 5 | 4 |
| E-3 | 5 | 1 | 2 | 2 |
| D-2 | 5 | 1 | 2+ | 2+ |
| A-2 | 5 | 1 | 2+ | 2+ |
| C-1 | 5 | 1 | 4+ | 4 |
| A-1 | 5 | 1 | 4+ | 4 |
| A-3 | 5 | 1 | 4+ | 4 |
| E-6 | 5 | 1.0 | 4+ | 4 |
| E-7 | 5 | 1 | 2 | 2 |
| E-8 | 5 | 1 | 4 | 4 |
| E-8 | 5 | 1 | 5 | 4 |
| Section C | | | | |
| J-1 | 4 | 2.2 | 4 | 4 |
| D-1 | 1 | .2 | 4− | 2 |
| D-1 | 2 | .4 | 4 | 2 |
| D-1 | 4 | .8 | 3− | 2 |
| D-2 | 1 | .2 | 4− | 2 |
| D-2 | 2 | .4 | 4 | 2 |
| D-2 | 4 | .8 | 3+ | 2 |
| A-2 | 1 | .2 | 4− | 2 |
| A-2 | 2 | .4 | 4 | 2 |

TABLE I-continued

| Chemical Code | ppm Used | ppm Active | Water Clarity | Degree of Separation |
|---|---|---|---|---|
| A-2 | 4 | .8 | 3+ | 2 |
| A-1 | 1 | .55 | 4− | 2 |
| A-1 | 2 | 1.10 | 4 | 2 |
| A-1 | 4 | 2.2 | 3 | 2 |

Water: 4 weight percent oil emulsified in the water, 20 API oil

Description of Table I

Water samples for Table I were from an oil field using a natural underground water drive for oil recovery. The produced water samples contained four weight percent (4%) emulsified oil. The standard chemical, J-1, was used for comparison in the Bottle tests. Table I is divided into three sections A, B, and C. Section A is the Ratio test; Section B is the Elimination test; and Section C is the Confirmation test.

Section A provided the initial dosage needed for the test run in Section B. At 5 ppm, three of the new chemicals performed as well as the standard at less than half of the active dosage. Section C demonstrates the performance of the new chemicals at a variety of ranges. Even at the lowest active dosage, performance as better than the standard chemical, J-1.

TABLE II

| Chemical Code | ppm Used | ppm Active | Water Clarity | Degree of Separation |
|---|---|---|---|---|
| Section A |  |  |  |  |
| Std G-6 | 1 | .35 | 4 | 7 |
| Std G-6 | 2 | .70 | 3+ | 5 |
| Std G-6 | 4 | 1.4 | 3 | 5 |
| Std G-6 | 8 | 2.8 | 3− | 5 |
| Std G-6 | 10 | 3.5 | 5 | 8 |
| Std Blank | — | — | 10 | 10 |
| Section B |  |  |  |  |
| Std G-6 | 8 | 2.8 | 4 | 5 |
| Std J-1 | 8 | 4.4 | 2 | 2 |
| Std I-14 | 8 | 4.0 | 4 | 3− |
| Std I-13 | 8 | 4.0 | 6 | 5 |
| Std G-4 | 8 | 2.8 | 4 | 3− |
| Std E-1 | 8 | 1.6 | 4+ | 4 |
| Std B-1 | 8 | 1.6 | 3 | 4 |
| Std E-17 | 8 | 1.6 | 5+ | 4+ |
| Std A-1 | 8 | 1.6 | 4 | 4 |
| Std E-3 | 8 | 1.6 | 5 | 3 |
| Std D-2 | 8 | 1.6 | 4 | 4 |

Water: One weight percent oil emulsified in the produced water; 22 API oil.

Description of Table II

Water samples for Table II were from an oil field using a natural underground water drive for oil recovery. The produced water samples contained one weight percent (1%) emulsified oil. The water temperature was 65° F. The standard chemical, G-6, was used for comparison in the Bottle tests. The Table is divided into two sections A and B. Section A is the Ratio test and Section B is the Elimination test. Several of these new chemistries matched the performance of the standard for water clarity but were better for separating the emulsified oil.

TABLE III

| Chemical Code | ppm Used | ppm Active | Water Clarity | Degree of Separation |
|---|---|---|---|---|
| Std G-4 | 3 | 1.05 | 1 | 1 |
| Std F-2 | 3 | .6 | 3 | 3 |
| Std I-4 | 3 | 1.5 | 1 | 3 |
| Std I-5 | 3 | 1.5 | 2 | 2 |
| Std I-9 | 3 | 1.5 | 2 | 3 |
| Std I-13 | 3 | 1.5 | 2 | 3 |
| Std I-14 | 3 | 1.5 | 3 | 2 |
| Std F-4 | 3 | 1.05 | 5 | 6 |
| Std F-1 | 3 | .6 | 3 | 3 |
| Std G-2 | 3 | .75 | 1 | 2 |
| Std G-6 | 3 | 1.05 | 1 | 2 |
| Std I-1 | 3 | 1.8 | 4 | 4 |
| Std E-6 | 3 | .6 | 2 | 1 |
| Std E-1 | 3 | .6 | 1− | 1 |
| Std B-1 | 3 | .6 | 1− | 1 |
| Std A-1 | 3 | .6 | 1− | 1 |
| Std E-3 | 3 | .6 | 2 | 1 |
| Std D-2 | 3 | .6 | 1− | 1 |
| Std A-2 | 3 | .6 | 1 | 1 |
| Std C-1 | 3 | .6 | 2 | 1 |

Description of Table III

Water samples for Table III were from an oil field using a waterflood oil recovery system. The produced water samples contained five percent (5%) emulsified oil, 20–22 API oil. The standard chemical, G-4, was used for comparison in the Elimination test. As can be seen in Table III, several of the new chemicals performed as well as the standard at less than 43% of the active dosage.

TABLE IV

| Chemical Code | ppm Used | ppm Active | Water Clarity | Degree of Separation |
|---|---|---|---|---|
| Std F-1 | 1 | 0.15 | 2 | 2 |
| Std F-1 | 2 | 0.30 | 2 | 2 |
| Std F-1 | 4 | 0.60 | 2 | 2 |
| Std F-1 | 6 | 0.90 | 2 | 2 |
| Std F-1 | 8 | 1.2 | 2 | 3 |
| Std F-1 | 10 | 1.5 | 2 | 2 |
| Blank | — | — | 9 | 9 |
| Std F-1 | 4 | 0.6 | 4 | 3 |
| Std E-2 | 4 | 0.8 | 2 | 2 |
| Std E-1 | 4 | 0.8 | 2 | 2 |
| Std C-1 | 4 | 0.8 | 3 | 2 |
| Std A-1 | 4 | 0.8 | 2 | 2 |
| Std E-9 | 4 | 0.8 | 2 | 2 |
| Std F-1 | 4 | 0.8 | 4 | 3 |
| Std E-3 | 4 | 0.8 | 2 | 1 |
| Std D-2 | 4 | 0.8 | 2+ | 1 |
| Std A-2 | 4 | 0.8 | 2 | 1 |
| Std C-1 | 4 | 0.8 | 1− | 1 |
| Std A-3 | 4 | 0.8 | 3 | 1 |
| Std E-6 | 4 | 0.8 | 3+ | 1 |
| Std E-7 | 4 | 0.8 | 3+ | 1 |
| Std G-6 | 4 | 1.4 | 3 | 3 |
| Std F-3 | 4 | 1.4 | 10 | 10 |
| Std F-4 | 4 | 1.4 | 10 | 10 |

Description of Table IV

Water samples for Table IV were from an oil field using a polymer flood oil recovery system. The produced water samples contained four percent (4%) emulsified oil, 20–20 API oil. The standard chemical, F-1, was used for comparison in the Elimination tests. As can be seen from Table IV, several of the new chemicals were better in performance in both water clarity and flocculation than the standard.

TABLE V

| Chemical Code | ppm Used | ppm Active | Water Clarity |
|---|---|---|---|
| Section A |  |  |  |

TABLE V-continued

| Chemical Code | ppm Used | ppm Active | Water Clarity |
|---|---|---|---|
| I-2 (Std) | 6 | 3 | 5 |
| I-2 (Std) | 8 | 4 | 3 |
| I-2 (Std) | 10 | 5 | 6 |
| I-2 (Std) | 12 | 6 | 6 |
| I-2 (Std) | 14 | 7 | 6 |
| Section B | | | |
| A-1 | 20 | 4 | 4 |
| E-2 | 20 | 4 | 7 |
| E-3 | 20 | 4 | 7 |
| E-6 | 20 | 4 | 7 |
| E-12 | 20 | 4 | -4 |
| F-1 | 20 | 3.6 | 4 |
| F-5 | 20 | 6.0 | 4 |
| Section C | | | |
| I-2 | 8 | 4 | 6 |
| E-3 | 5 | 1 | 8 |
| E-3 | 10 | 2 | 8 |
| E-3 | 15 | 3 | 8 |
| E-3 | 20 | 4 | 6 |
| E-3 | 25 | .5 | 4 |
| E-12 | 5 | 1 | 9 |
| E-12 | 10 | 2 | 9 |
| E-12 | 15 | 3 | 9 |
| E-12 | 20 | 4 | 7 |
| E-12 | 25 | 5 | 6 |

Water: The oil-in water emulsion was obtained from a steam flooded application.

Description of Table V

Water samples for Table V were from an oil field using a steam flood oil recovery system. The produced water samples contained ten weight percent (10%) emulsified oil at 200° F., 9–12 API oil. The standard chemical, I-7, was used for comparison in the tests. The Table is divided into three sections A, B, and C. Section A is the Ratio test; Section B is the Elimination test; and Section C is the Confirmation test. As can be seen from the Table, the new chemicals matched the water clarity of the standard.

Having described our invention, we claim, as follows:

1. A method for resolving an oil-in-water emulsion comprising dosing the emulsion to be resolve at a pH below about 8 with from 0.1 to 20 ppm active polymer, said polymer contained in an oil-in-water emulsion produced by the emulsion polymerization of only hydrophobic monomers, where at least one hydrophobic monomer is a neutral amine containing monomer which becomes hydrophilic when the amine is salified, the polymer containing at least 40 mole percent amine containing monomer; and salifying the amine containing polymer, at a pH below about eight, whereby the polymer becomes solubilized, and then resolving and separating oil from the oil-in-water emulsion.

2. A method for resolving an oil-in-water emulsion comprising dosing the emulsion to be resolved, at a pH below about 8, with from 0.1 to 20 ppm active polymer which polymer is contained in an oil-in-water emulsion produced by the oil-in-water emulsion polymerization of only hydrophobic monomers wherein at least one monomer is a hydrophobic monomer which contains an amine, the polymer containing at least 40 mole percent of the hydrophobic monomer which contains an amine; and salifying the amine containing polymer, whereby the polymer becomes solubilized and then resolving the oil-in-water emulsion into its component oil and water parts, and then separating the oil therefrom.

3. A method for resolving hydrocarbon oil from produced water obtained from an oil field comprising dosing the produced water to be resolved with an oil-in-water polymer latex reverse emulsion breaker, such that the produced water is treated with from 0.1 to 20 ppm active polymer said polymer contained in an oil-in-water emulsion produced by the polymerization of only hydrophobic monomers including a non-amine containing acrylate monomer and a monomer which contains an amine, said polymer containing at least 40 mole percent of amine-containing monomer; and salifying at a pH below about eight the polymer whereby the polymer becomes solubilized, and the produced water is resolved into its hydrocarbon and aqueous portions, and then removing the hydrocarbon portion therefrom.

4. The method of claim 3 wherein the polymer in the reverse emulsion breaker has a molecular weight of at least 2,000,000.

5. The method of claims 1, 2, 3 or 4, wherein the polymer contained in an oil-in-water emulsion contains from 50–60 mole percent of hydrophobic monomer from the group consisting of ethyl acrylate, methyl methacrylate, butyl acrylate, isobutylacrylate, stearyl methacrylate, lauryl acrylate, and styrene; and of from 40–50 mole percent of an amine containing monomer selected from the group consisting of:
Dimethylaminoethylmethacrylate
Diethylaminoethylmethacrylate
Dimethylaminoethylacrylate
Diethylaminoethylacrylate
Dimethylaminopropylmethacrylate
Dimethylaminopropylacrylamide
Dimethylaminoethylacrylamide
Diethylaminoethylacrylamide
N,N-Diallylcyclohexylamine
Diallylmethylamine
Dimethylaminoethylmethacrylamide
Diethylaminoethylmethacrylamide 6. The method of claim 5 wherein the polymer is dimethylaminoethylmethacrylate/ethylacrylate/methylmethacrylate having a mole ratio of from
40 to 50 dimethylaminoethylmethacrylate/
20 to 30 ethylacrylate/20 to 30 methylmethacrylate.

* * * * *